Dec. 30, 1924.

F. J. SILVA 1,521,052

DRAWBAR ATTACHMENT FOR TRACTORS

Filed Nov. 14, 1922     2 Sheets—Sheet 1

INVENTOR.
FRANKLYN J. SILVA.
BY Dewey Strong,
Townsend and Loftus
ATTORNEYS.

Dec. 30, 1924.  
F. J. SILVA  
1,521,052  
DRAWBAR ATTACHMENT FOR TRACTORS  
Filed Nov. 14, 1922  
2 Sheets-Sheet 2

INVENTOR.  
FRANKLYN J. SILVA.  
BY  
ATTORNEYS.

Patented Dec. 30, 1924.

1,521,052

UNITED STATES PATENT OFFICE.

FRANKLYN J. SILVA, OF OAKLAND, CALIFORNIA, ASSIGNOR TO MOSES M. KAHN, OF SAN FRANCISCO, CALIFORNIA.

DRAWBAR ATTACHMENT FOR TRACTORS.

Application filed November 14, 1922. Serial No. 600,800.

*To all whom it may concern:*

Be it known that I, FRANKLYN J. SILVA, a citizen of the United States, residing at Oakland, county of Alameda, and State of California, have invented new and useful Improvements in Drawbar Attachments for Tractors, of which the following is a specification.

This invention relates to tractors and particularly pertains to adapting a tractor of the Fordson type to heavy duty.

It is the principal object of the present invention to adapt a tractor of the Fordson type for heavy duty work by equipping it with a generally improved drawbar attachment and by compensating for the increase in weight and pull caused by heavy duty work.

The invention contemplates the use of a sub-frame securely anchored to the axle and transmission housings of a tractor and to which a drawbar may be easily and quickly connected or detached; means are also provided to compensate for the weight of the attachment alluded to, and the increased pull caused by heavy duty.

One form which the present invention may assume is exemplified in the following description and illustrated by way of example in the accompanying drawings, in which.

Figure 1:
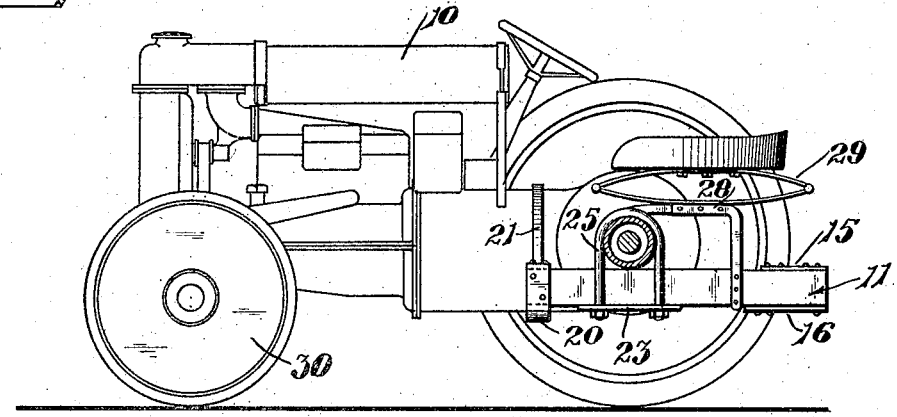
Fig. 1 is a side elevation of the Fordson type of tractor illustrating the preferred form of the invention mounted thereon.
Figure 2:
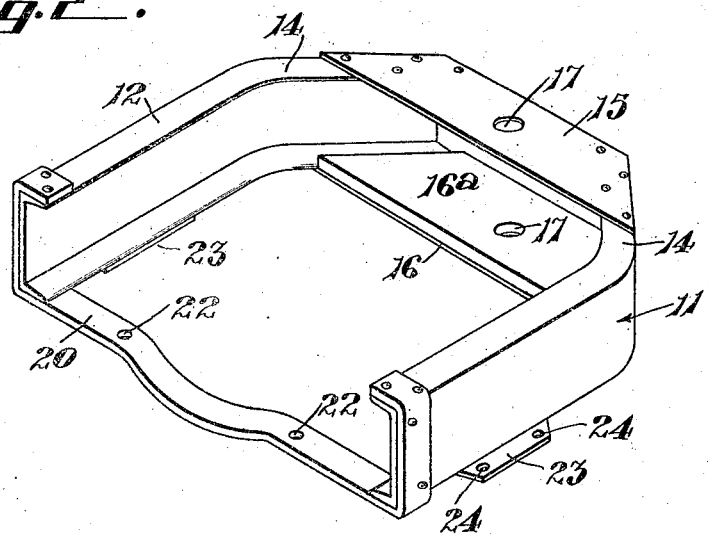
Fig. 2 is a perspective view of a device embodying the invention.

Referring more particularly to the drawings, 10 indicates a tractor of the Fordson type equipped with a drawbar attachment 11. The attachment 11 is most clearly shown in Fig. 2 and consists of a pair of channel bar side members 12 formed with inturned ends 14. These ends are connected by an upper plate 15 and a lower plate 16. The lower plate is equipped with a wear plate 16 which may be detachably secured thereto in any desirable manner permitting its removal and replacement. The upper end lower plate and the wear plate are formed with aligned holes 17 for the reception of king pin 18 which may be inserted to maintain a drawbar 19 in place between the plates.

The front ends of the channel side members 12 are rigidly connected by a transverse bar 20 which is formed to embrace the ends of the side members as shown. This transverse bar extends beneath the transmission housing of the tractor, and is securely anchored thereto by means of a strap U-bolt 21. The ends of this bolt pass through openings 22 in the bar for the reception of nuts which firmly connect the bar and the housing.

Figure 3:
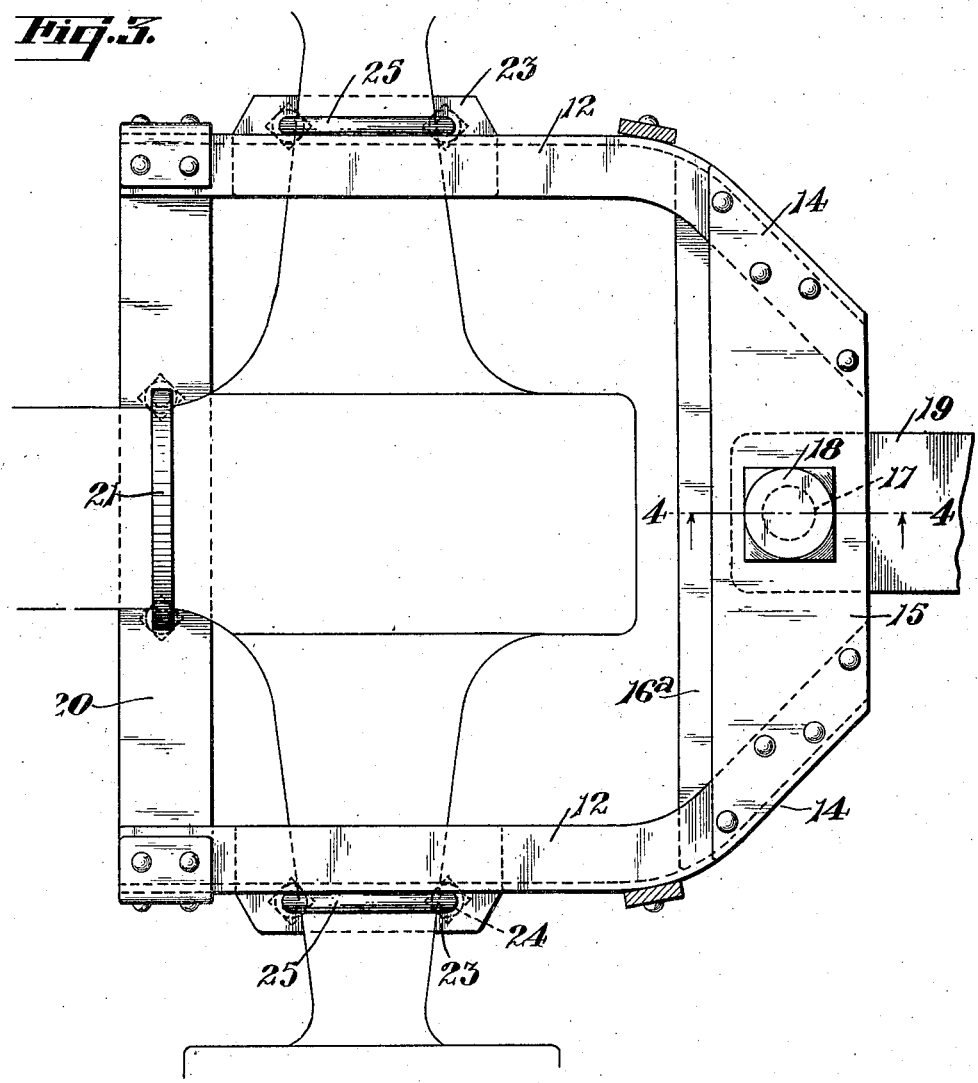
Fig. 3 is a view in plan of the invention anchored to the axle housing and transmission housing of a tractor.
Figure 4:
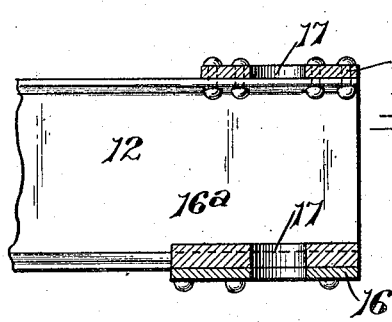
Fig. 4 is a section taken on line 4—4 of Fig. 3.

Each side member 12 is fitted with a clip 23 which is formed with holes 24 for the reception of the ends of U-bolts 25. By means of these bolts, the side members 12 may be rigidly anchored to the axle housing of a tractor as shown in Fig. 3.

Secured to each side member 12 is an upright supporting bar formed with a horizontal extension 26 which connects with an elliptical spring 28. This spring serves to support a seat 29. The front end of the horizontal extension 27 is supported by the top of the axle housing.

To compensate for the weight of the attachment when mounted on the rear of the tractor, a weight 30 is fitted to each front wheel. These weights are designed to fit over the wheel hub and nest within the felloe snugly against the disc portion of the wheel. These weights tend to overcome the tractor's tendency to raise on its rear wheels the moment a comparatively heavy load is attached to the rear of the machine.

In operation of the device, the drawbar attachment is constructed as shown and described and is mounted beneath the axle and transmission housings. The U-bolts 21 and 25 may then be fitted and drawn up until the sub-frame is securely anchored to the housings alluded to.

The supports 26 may be then secured to the side bars 12 and the seat with its springs erected and secured in proper position.

To compensate for the increased weight of the rear end of the tractor the weights are applied to the front wheels as described. These weights serve to maintain all the wheels of the tractor on the ground even when pulling a maximum load. It is seen that by mounting the drawbar attachment below the axle and by applying weights to the wheels, the center of gravity of the tractor is considerably lowered and will hold the road under practically all conditions.

From the foregoing it is seen that by the use of comparatively simple expedients I have equipped a tractor of the Fordson type for heavy duty, and although I have shown and described the invention in detail, it is to be understood that various changes in the construction and arrangement of the parts may be made by those skilled in the art without departing from the spirit of the invention as claimed.

Having thus described my invention, what I claim and desire to secure by Letters Patent is:

1. In combination with a tractor of a draw bar attachment therefor comprising a frame adapted to be suspended beneath the axle and transmission housings of the tractor, said frame comprising a pair of side members, plates connecting one end of the side members and located at the top and bottom thereof for receiving a drawbar, a transverse bar rigidly connecting the other ends of the side members and located at the bottom thereof whereby it will extend beneath the transmission housing of the tractor, and a strap member connected at its ends to said transverse bar and impressing the transmission housing to firmly connect the frame thereto, and U-bolts for connecting said side members to the axle housing whereby weight imposed by a drawbar on the frame will be transmitted to the axle and transmission housings of the tractor.

2. In combination with a tractor of a drawbar attachment therefor comprising a frame adapted to be suspended beneath the axle and transmission housings of the tractor, said frame including a pair of channeled side members, plates rigidly connecting one end of said side members and located at the top and bottom thereof, a wearing plate detachably mounted on the top surface of the bottom plate, all of said plates being formed with an aligned opening for the reception of a king bolt to lock a draw bar inserted between the top plate and the wearing plate, a transverse bar rigidly connecting the other ends of the side members, said transverse bar being adapted to extend beneath the transmission housing of the tractor, a strap U-bolt adapted to impress the transmission housing and being connected at its ends to said transverse bar whereby to anchor the end of the frame securely to said transmission housing, clips on said side members, and U-bolts adapted to embrace the ends of the axle housing and be connected to said clips whereby to anchor said side members to the ends of the axle housing.

FRANKLYN J. SILVA.